United States Patent
Luo et al.

(10) Patent No.: US 12,292,738 B2
(45) Date of Patent: May 6, 2025

(54) TRAJECTORY PLANNING METHOD, COMPUTER-READABLE STORAGE MEDIUM, AND ROBOT

(71) Applicant: UBTECH ROBOTICS CORP LTD, Shenzhen (CN)

(72) Inventors: Qiuyue Luo, Shenzhen (CN); Ligang Ge, Shenzhen (CN); Yizhang Liu, Shenzhen (CN); Jie Bai, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 203 days.

(21) Appl. No.: 18/222,448

(22) Filed: Jul. 16, 2023

(65) Prior Publication Data
US 2023/0359207 A1 Nov. 9, 2023

Related U.S. Application Data

(63) Continuation of application No. PCT/CN2021/124612, filed on Oct. 19, 2021.

(30) Foreign Application Priority Data

Feb. 21, 2021 (CN) .......................... 202110194548.4

(51) Int. Cl.
*B25J 11/00* (2006.01)
*B25J 9/10* (2006.01)
*G05D 1/00* (2006.01)

(52) U.S. Cl.
CPC .............. *G05D 1/0212* (2013.01); *B25J 9/10* (2013.01); *B25J 11/00* (2013.01)

(58) Field of Classification Search
CPC ............ G05D 1/0212; B25J 9/10; B25J 11/00
See application file for complete search history.

(56) References Cited

U.S. PATENT DOCUMENTS

| 2021/0251838 A1* | 8/2021 | Ortlieb | B25J 9/0006 |
| 2023/0064815 A1* | 3/2023 | Luo | B25J 9/163 |

(Continued)

FOREIGN PATENT DOCUMENTS

CN 110286679 A 9/2019

OTHER PUBLICATIONS

Or, Computer Simulations of a Humanoid Robot Capable of Walking Like Fashion Models, 2012, IEEE, p. 241-248 (Year: 2012).*

(Continued)

*Primary Examiner* — Mcdieunel Marc (57) ABSTRACT

A trajectory planning method, a computer-readable storage medium, and a robot are provided. The method includes: constructing a phase variable of a trajectory planning of a robot, where the phase variable is a function of two position components of a torso of the robot on a horizontal plane; and performing, using the phase variable replacing a time variable, the trajectory planning on a swinging leg of the robot in each preset coordinate axis direction. In this manner, the robot can no longer continue to follow the established trajectory after being disturbed by the environment, but make state adjustments according to the disturbance received to offset the impact of the disturbance, thereby maintaining walking stability and avoiding the problem of early or late landing of the swinging leg.

20 Claims, 7 Drawing Sheets

(56) References Cited

U.S. PATENT DOCUMENTS

2023/0069928 A1* 3/2023 Brossette ............. A61H 1/0266
2023/0278212 A1* 9/2023 Luo ....................... B25J 9/1653
                                                              700/254

OTHER PUBLICATIONS

Jianghai et al., Walking pattern generation of biped robot using trajectory planning of gravity center, 2014, IEEE, p. 890-895 (Year: 2014).*
Riyanto et al., Center of Mass based Walking Pattern Generator with Gravity Compensation for Walking Control on Bioloid Humanoid Robot, 2018, IEEE, p. 629-632 (Year: 2018).*
Zhang et al., Research on Gait Planning and in verse Kinematics Solving of Biped Walking Robots, 2015, IEEE, p. 629-632 (Year: 2015).*
ISR for PCT/CN2021/124612.
Written opinions of ISA for PCT/CN2021/124612.
"Self-Synchronization and Self-Stabilization of Walking Gaits Modeled by the Three-Dimensional LIP Model", Qiuyue Luo, "IEEE Robotics and Automation Letters, vol. 3, No. 4", Oct. 2018, pp. 3332-3339.

* cited by examiner

TRAJECTORY PLANNING METHOD, COMPUTER-READABLE STORAGE MEDIUM, AND ROBOT

CROSS REFERENCE TO RELATED APPLICATIONS

The present disclosure is a continuation-application of International Application PCT/CN2021/124612, with an international filing date of Oct. 19, 2021, which claims foreign priority of Chinese Patent Application No. 202110194548.4, filed on Feb. 21, 2021 in the State Intellectual Property Office of China, the contents of all of which are hereby incorporated by reference.

BACKGROUND

1. Technical Field

The present disclosure relates to robot technology, and particularly to a trajectory planning method, a computer-readable storage medium, and a robot.

2. Description of Related Art

In the existing technology, it usually performs trajectory planning on a swinging leg of a biped humanoid robot based on time variables. However, when disturbed by the environment where the robot is positioned, the position and posture of the robot will deviate from the original trajectory. In this case, if a time variable-based trajectory planning method is used, there will be the problem of early or late landing of the swinging leg of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" (and "comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the description of the present disclosure, the terms "first", "second", "third", and the like in the descriptions are only used for distinguishing, and cannot be understood as indicating or implying relative importance.

For the sake of brevity, unless otherwise specified, a biped humanoid robot having two legs is taken as an example of robot (other robots with more legs may also be used). In which, the biped robot may have a torso, a waist, and two leg each includes an ankle joint.

Because every robot is a complex mechanism with a high degree of freedom, a simplified model of the robot is often used to analysis its motion features. In this embodiment, a linear inverted pendulum model (LIPM) may be used to substitute the complete model of the robot. In which, the ankle joint of the robot is taken as a passive joint, so the whole robot is an underactuated system. Compared with the control method based on a zero moment point (ZMP), this method can make full use of gravity as the driving force of the robot so as to save energy and have higher walking efficiency, and is also more similar to the walking features of humans.

In this embodiment, for a coordinate system established on a horizontal plane where the ankle joint of a supporting leg (one of the legs of the robot that touches the ground where the robot stands) is located, where the origin of the coordinate system is located at where supporting the ankle joint, the x-axis of the coordinate system points to the moving direction of the robot, the y-axis of the coordinate system points to the inner side of the robot, and the z-axis goes vertically upward.

When the robot is simplified to the LIPM and the ZMP is assumed to be (0.0), its dynamic model will be as equations of:

$$\ddot{x} = \omega^2 x;\ \text{and}$$

$$\ddot{y} = \omega^2 y;$$

where, x is the position of the center of mass (centroid) of the LIPM on the x-axis, y is the position of the center of mass of the LIPM on the y-axis, is the acceleration of the center of mass of the LIPM on the x-axis, ÿ is the acceleration of the center of mass of the LIPM on the y-axis. $\omega = \sqrt{(g/z)}$, g is the acceleration due to gravity, and z is the height of the center of mass of the LIPM from the ground.

Figure 1:
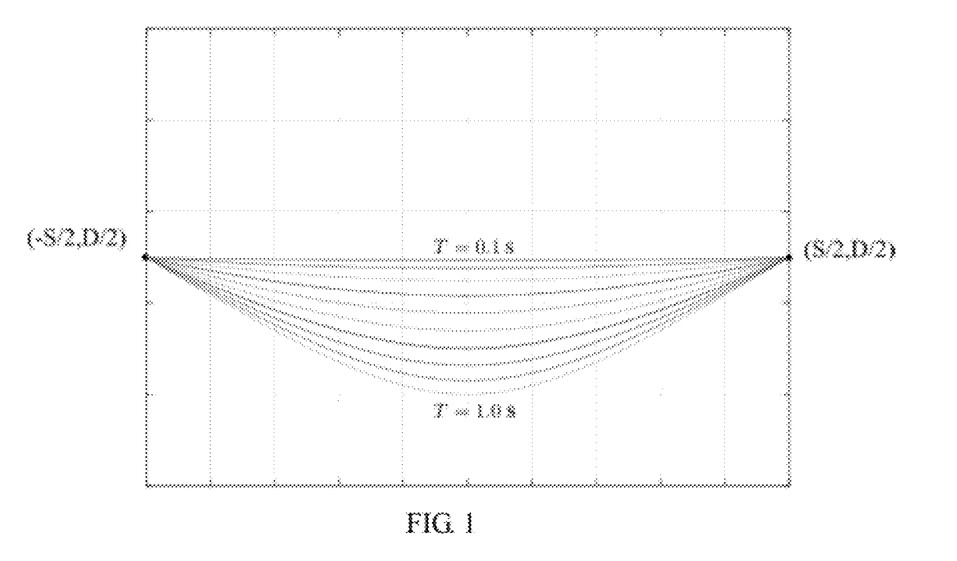
FIG. 1 is a schematic diagram of a periodic trajectory of a linear inverted pendulum model according to an embodiment of the present disclosure.

FIG. 1 is a schematic diagram of a periodic trajectory of a linear inverted pendulum model according to an embodiment of the present disclosure. A stable periodic trajectory of the LIPM is as shown in FIG. 1. The larger the period (denoted as T), the larger the amplitude of the trajectory of the center of mass of the LIPM, but its center of mass will eventually pass through the point $$\left(\frac{S}{2}, \frac{D}{2}\right),$$

where S is the step size of the robot, and D is the step width of the robot.

In this embodiment, a function, of two position components (where the position component on the x-axis is denoted as $x_w$, and that on the y-axis is denoted as $y_w$) of the torso of the robot on the horizontal plane, that is, the phase variable (denoted as Φ) can be constructed. In which, the position of the torso of the robot relative to the origin of the coordinate system (i.e., the position of the waist of the robot) may be calculated using forward kinematics according to the feedback values of the angle of joint.

Φ needs to meet two conditions. First, change from 0 to 1; second, strictly monotonically increasing. In order to ensure the condition that Φ must be equal to 1 at the end of each step, it is necessary to construct a functional relationship of the moment before switching the supporting leg that is along the position of the torso in the x and y axis directions. In this embodiment, a spatial two-dimensional plane that meets the following conditions may be constructed:

$$\mathbb{S} = \left\{(x_w, y_w, z_w) \middle| \left(x_w - \frac{S}{2}\right) + C\left(y_w - \frac{D}{2}\right) = 0\right\}.$$

Figure 2:
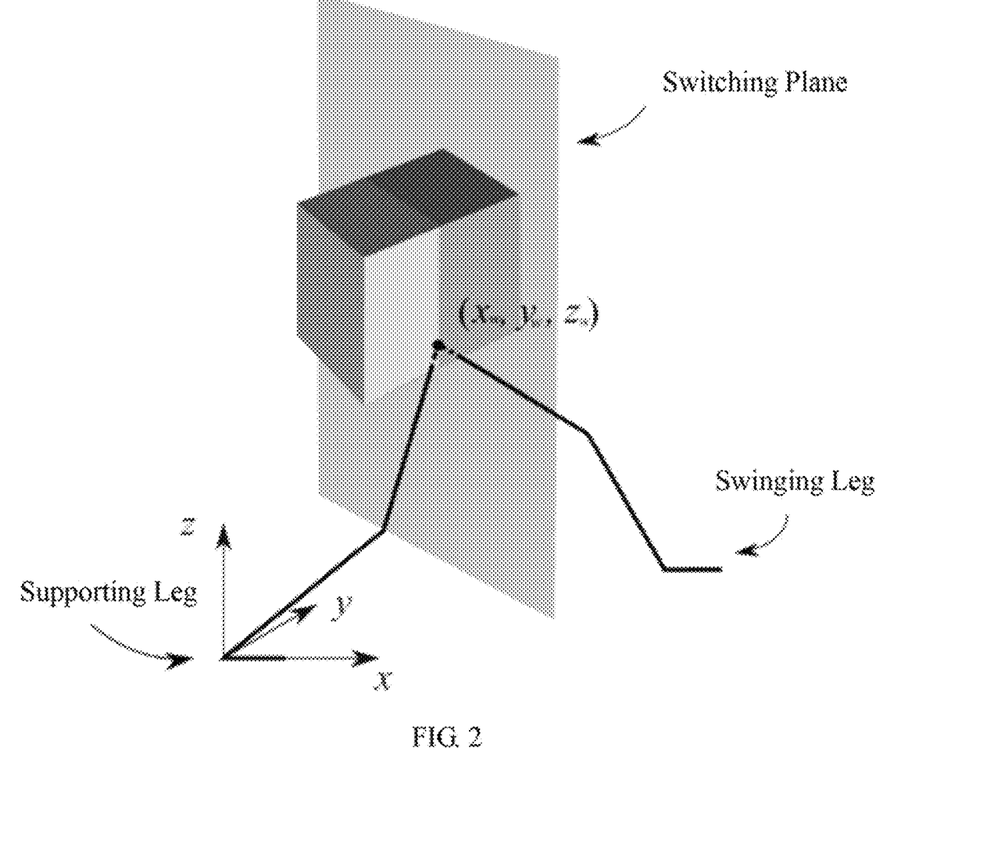
FIG. 2 is a schematic diagram of a switching plane of a robot according to an embodiment of the present disclosure.

FIG. 2 is a schematic diagram of the plane $\mathbb{S}$ referred to as a switching plane of the robot according to an embodiment of the present disclosure. In which, $z_w$ is the position component of the torso of the robot on the z-axis, and C is a slope parameter of the switching plane. The value of C may be set according to the actual needs, which is not limited herein. In the walking process of the robot, the height of the torso of the robot is constrained so that it is in the same horizontal plane.

Figure 3:
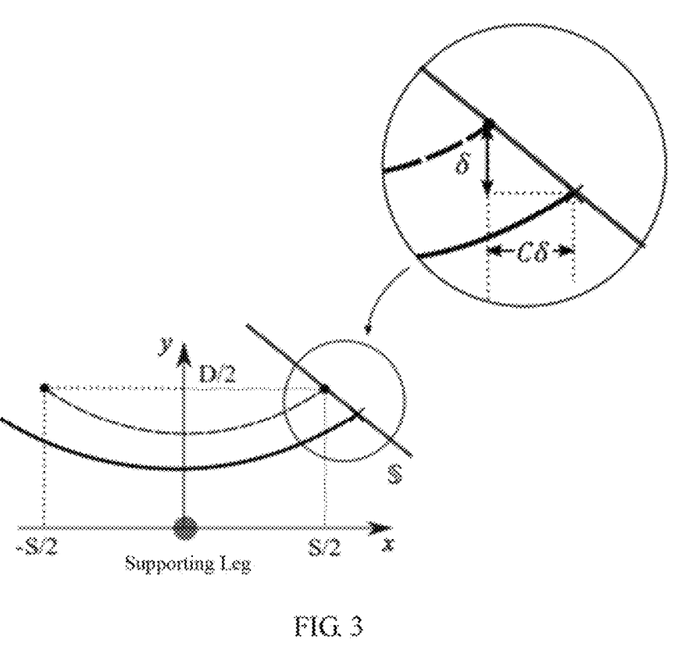
FIG. 3 is a schematic diagram of a position error relation of a robot according to an embodiment of the present disclosure.

FIG. 3 is a schematic diagram of a position error relation of the robot according to an embodiment of the present disclosure. As shown by the dotted line trajectory in FIG. 3, when the robot is simplified to the LIPM, its stable periodic trajectory always starts from $$\left(-\frac{S}{2}, \frac{D}{2}\right)$$

and ends at $$\left(\frac{S}{2}, \frac{D}{2}\right);$$

and as shown by the solid line trajectory in FIG. 3, when the robot is disturbed, its motion trajectory will deviate from the original stable periodic trajectory. As shown by the straight line in FIG. 3, the intersection of the plane where the torso of the robot is positioned and the switching plane may be regarded as a straight line. The straight line defines the relationship between the position errors of the torso in the x-axis and y-axis directions as an equation of:

$$\delta x_w = C \delta y_w;$$

where, $\delta x_w$ is a position error component of the torso on the x-axis, and $\delta y_w$ is a position error component of the torso on the y-axis. When disturbed, the values of $\delta x_w$ and $\delta y_w$ are unknown, but will always satisfy the relationship shown in the forgoing equation.

In the walking process of the robot, the landing position and the swing time of the swinging leg are very important factors affecting the stability of walking. When the robot is disturbed, the position and posture of the robot will deviate from the original trajectory. If the time variable is used to plan the controlled joints of the robot, the problem of early or late landing will occur. In this embodiment, the internal state of the robot (i.e., the phase variable) may be used to substitute the time variable, and the robot will automatically adjust the swing time according to the disturbance received so as to maintain a stable gait.

Figure 4:
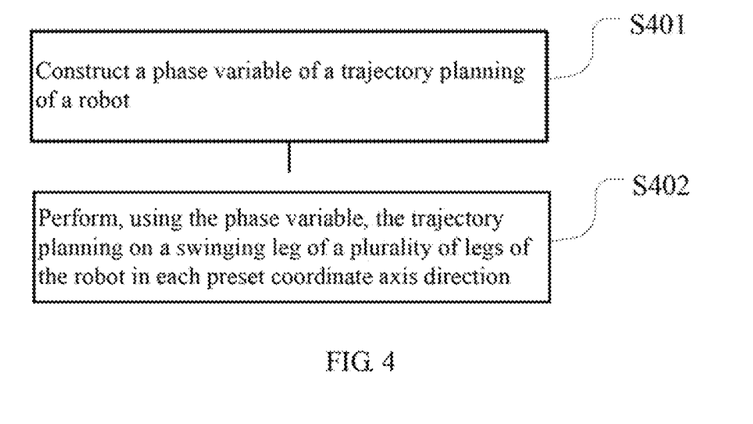
FIG. 4 is a flow chart of a robot trajectory planning method according to an embodiment of the present disclosure.

FIG. 4 is a flow chart of a robot trajectory planning method according to an embodiment of the present disclosure. As shown in FIG. 4, in this embodiment, a trajectory planning method for the robot may include the following steps.

S401: constructing a phase variable of a trajectory planning of the robot.

In a two-dimensional space, the phase variable may be the displacement of the robot along the direction of movement, or the angle between the supporting leg and the ground. In three-dimensional space, the phase variable needs to involve both of two components of the state of the robot on the horizontal plane, for example, the displacements of the position of the torso of the robot in the moving direction and the lateral direction. In which, the displacement in the motion direction is monotonously increasing, and the displacement in the lateral direction is non-monotonic. However, in this embodiment, it is necessary to construct one monotonically increasing phase variable based on the two.

Figure 5:
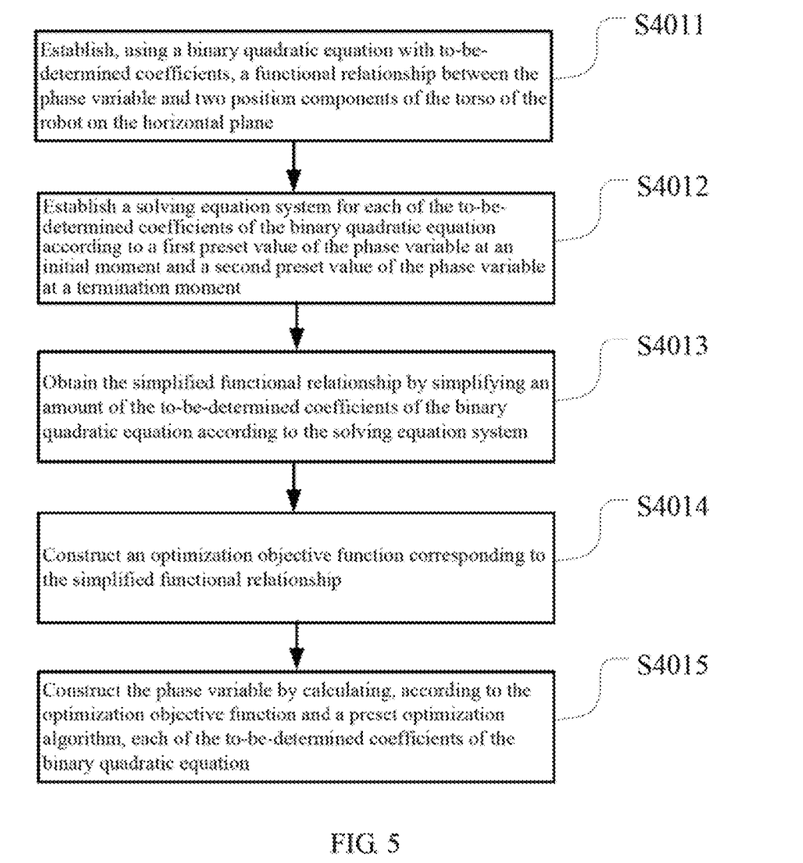
FIG. 5 is a flow chart of an example of constructing a phase variable for trajectory planning of a robot according to an embodiment of the present disclosure.

FIG. 5 is a flow chart of an example of constructing the phase variable for the trajectory planning of the robot according to an embodiment of the present disclosure. In this embodiment, the phase variable may be a function of two position components of the torso of the robot on the horizontal plane. As shown in FIG. 5, step S401 may include the following steps.

S4011: establishing, using a binary quadratic equation with to-be-determined coefficients, a functional relationship between the phase variable and two position components of the torso of the robot on the horizontal plane.

For example, the functional relationship as shown in the following equation may be established as an equation of:

$$\Phi = a_1 x_w + a_2 y_w + a_3 x_w y_w + a_4 x_w^2 + a_5 y_w^2 + a_6;$$

where, $a_1$, $a_2$, $a_3$, $a_4$, $a_5$ and $a_6$ are the to-be-determined coefficients.

S4012: establishing a solving equation system for each of the to-be-determined coefficients of the binary quadratic equation according to a first preset value of the phase variable at an initial moment and a second preset value of the phase variable at a termination moment.

First, a first solving equation of the binary quadratic equation may be established according to the first preset value of the phase variable at the initial moment (of the period T). From the forgoing analysis, it may be seen that the phase variable is always 0 at the initial moment, that is, $\Phi(x_{w0}, y_{w0})=0$, where $(x_{w0}, y_{w0})$ are the two position components of the torso of the robot on the horizontal plane at the initial moment that are known quantities can be calculated according to the final state of the previous step of the robot. $\Phi(x_{w0}, y_{w0})$ is the value of the phase variable at the initial moment, and the first solving equation may be obtained, by substituting the above-mentioned functional relationship, as an equation of:

$$a_1 x_{w0} + a_2 y_{w0} + a_3 x_{w0} y_{w0} + a_4 x_{w0}^2 + a_5 y_{w0}^2 + a_6 = 0.$$

In addition, a second solving equation of the binary quadratic equation may be established according to the second preset value of the phase variable at the termination moment (of the period T). From the forgoing analysis, it may be seen that the phase variable is always 1 at the termination moment, that is, $\Phi(x_{wf}, y_{wf})=1$, where $(x_{wf}, y_{wf})$ are the two position components of the torso of the robot on the horizontal plane at the termination moment. In an ideal state, $$x_{wf} = \frac{S}{2}, \text{ and } y_{wf} = \frac{D}{2}.$$

However, in the case of being disturbed $$x_{wf} = \frac{S}{2} + \delta x_w, \text{ and } y_{wf} = \frac{D}{2} + \delta y_w.$$

$\Phi(x_{wf}, y_{wf})$ is the value of the phase variable at the termination moment, and the second solving equation may be obtained, by substituting the above-mentioned functional relationship, as an equation of:

$$a_1\left(\frac{S}{2} + \delta x_w\right) + a_2\left(\frac{D}{2} + \delta y_w\right) +$$
$$a_3\left(\frac{S}{2} + \delta x_w\right)\left(\frac{D}{2} + \delta y_w\right) + a_4\left(\frac{S}{2} + \delta x_w\right)^2 + a_5\left(\frac{D}{2} + \delta y_w\right)^2 + a_6 = 1$$

For the convenience of representation, in subsequent calculations, $\delta y_w$ will be abbreviated as $\delta$, and the position error relationship $\delta x_w = C \delta y_w$ will be substituted into the second solving equation, then it can get:

$$a_1\left(\frac{S}{2} + C\delta\right) + a_2\left(\frac{D}{2} + \delta\right) +$$

-continued $$a_3\left(\frac{S}{2} + C\delta\right)\left(\frac{D}{2} + \delta\right) + a_4\left(\frac{S}{2} + C\delta\right)^2 + a_5\left(\frac{D}{2} + \delta\right)^2 + a_6 = 1.$$

For any $\delta$, the constraints in the above-mentioned equation must be satisfied. Therefore, the coefficients in front of all the items containing $\delta$ in the above-mentioned equation must be 0, and the sum of the other items must be 1. Therefore, from the above-mentioned equation, each derivative solving equation can be obtained as equations of:

$$a_1(S/2) + a_2(D/2) + a_3(S/2)(D/2) + a_4(S/2)2 + a_5(D/2)2 + a_6 + 1;$$

$$-a_3 C + a_4 C^2 + a_5 = 0; \text{ and}$$

$$-a_1 C + a_2 - a_3 C(D/2) + a_3(S/2) - 2a_4 C(S/2) + 2a_5(D/2) = 0.$$

Finally, each derivative solving equation of the first solving equation and the second solving equation may be constructed into a solving equation system as:

$$\begin{cases} a_1 x_{w0} + a_2 y_{w0} + a_3 x_{w0} y_{w0} + a_4 x_{w0}^2 + a_5 y_{w0}^2 + a_6 = 0 \\ a_1(S/2) + a_2(D/2) + a_3(S/2)(D/2) + a_4(S/2)^2 + a_5(D/2)^2 + a_6 = 1 \\ -a_3 C + a_4 C^2 + a_5 = 0 \\ -a_1 C + a_2 - a_3 C(D/2) + a_3(S/2) - 2a_4 C(S/2) + 2a_s(D/2) = 0 \end{cases}.$$

S4013: Obtaining the simplified functional relationship by simplifying an amount of the to-be-determined coefficients of the binary quadratic equation according to the solving equation system.

The solving equation system contains 4 equations and 6 unknowns, namely to-be-determined coefficients $a_1$, $a_2$, $a_3$, $a_4$, $a_5$ and $a_6$. In which, four of the to-be-determined coefficients may be taken as a function with the other two to-be-determined coefficients as variables. For example, $a_1$, $a_2$, $a_3$, and $a_4$ may be taken a function with $a_5$ and $a_6$ as variables, respectively. In this manner, the 6 to-be-determined coefficients can be simplified to 2 to-be-determined coefficients, thereby obtaining the simplified functional relationship.

S4014: constructing an optimization objective function corresponding to the simplified functional relationship.

For example, the optimization objective function may be constructed as an equation of:

$$J = \Sigma(\Phi(t_i) - t_i/T)^2;$$

where, $t_i$ is the i-th moment in the period, $\Phi(t_i)$ is the value of the phase variable corresponding to $t_i$, and J is the optimization objective function. Since the phase variable must maintain a monotonous increase in the process of the robot completing a step, this optimization objective function selects a plurality of moments from the LIPM period. For the i-th moment, $(\Phi(t_i) - t_i/T)^2$ is used to measure the deviation between the phase variable and the unitized time variable, and the total deviation obtained by accumulating the deviations at each selected moment is the optimization objective function.

S4015: constructing the phase variable by calculating according to the optimization objective function and a preset optimization algorithm, each of the to-be-determined coefficients of the binary quadratic equation.

In this embodiment, any existing optimization algorithm such as stochastic gradient descent method, momentum algorithm, Adam algorithm or other optimization algorithms may be selected according to the actual needs so as to solve each to-be-determined coefficient of the binary quadratic equation, thereby completing the construction of the phase variable.

S402: performing, using the phase variable, the trajectory planning on a swinging leg of the plurality of legs of the robot in each preset coordinate axis direction.

First, the trajectory of the swinging leg of the robot in each coordinate axis direction may be expressed as a function of the phase variable. In which, the trajectory in the x-axis direction is denoted as xs($\Phi$), the trajectory in the y-axis direction is denoted as ys($\Phi$), and the trajectory in the z-axis direction is denoted as zs($\Phi$).

Then, the boundary conditions of the trajectories of the swinging leg of the robot in each coordinate axis direction may be determined respectively.

In which, the boundary conditions of the trajectory in the x-axis direction may be:

$$x_s(0)=x_{w0}, x_s(1)=S; \text{ and}$$

$$\hat{x}_s(0)=\hat{x}_{w0}, \hat{x}_s(1)=0.$$

The boundary conditions of the trajectory in the y-axis direction may be:

$$y_s(0)=y_{w0}, y_s(1)=D; \text{ and}$$

$$\hat{y}_s(0)=\hat{y}_{w0}, \hat{y}_s(1)=0;$$

where, $\hat{x}_{w0}$ is the velocity of the torso of the robot in the x-axis direction at the initial moment, and $\hat{y}_{w0}$ is the velocity of the torso of the robot in the y-axis direction at the initial moment. Both of which may be known quantities that can be calculated according to the final state of the last step of the robot. In an ideal state without considering collisions, both of which can be set to 0.

The boundary conditions of the trajectory in the z-axis direction may be:

$$z_s(0)=0, z_s(\Phi_m)=h_s, z_s(1)=0; \text{ and}$$

$$\hat{z}_s(1)=0, \hat{z}_s(\Phi_m)=0, \hat{z}_s(1)=0;$$

where, $h_s$ is the maximum height of the swinging leg, $0<\Phi_m<1$ and is an intermediate value of $\Phi$. When $\Phi=\Phi_m$, the swinging leg reaches the maximum height.

Finally, curve fitting may be performed on the trajectory of the swinging leg of the robot in each preset coordinate axis direction according to the boundary conditions, thereby obtaining the planned trajectory of the swinging leg of the robot in each preset coordinate axis direction.

In this embodiment, any existing curve fitting algorithm such as cubic polynomial curves, S-curves, cubic spline curves, cubic Hermits curves, and Bezier curves may be selected according to the actual needs. A smooth curve from the initial state to the final suite, that is, the planned trajectory of the swinging leg may be determined by curve fitting.

To sum up, in this embodiment, the time variable-based trajectory planning method is no longer used, but it constructs the phase variable of the trajectory planning of the robot, that is, the function of the two position components of the torso of the robot on the horizontal plane, then uses the phase variable substitute the time variable to perform the trajectory planning of the swinging leg of the robot in each preset coordinate axis direction, so that the robot can no longer continue to follow the established trajectory after being disturbed by the environment, but make state adjustments according to the disturbance received to offset the impact of the disturbance, thereby maintaining walking stability and avoiding the problem of early or late landing of the swinging leg.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
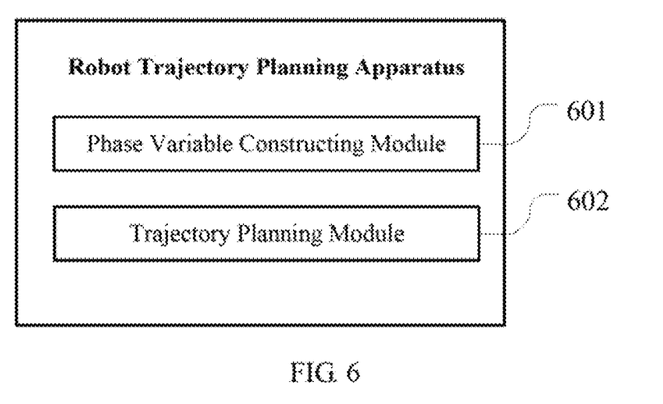
FIG. 6 is a schematic block diagram of the structure of a robot trajectory planning apparatus according to an embodiment of the present disclosure.

FIG. 6 is a schematic block diagram of the structure of a robot trajectory planning apparatus according to an embodiment of the present disclosure. A trajectory planning apparatus for the robot that corresponds to the above-mentioned trajectory planning method for the robot is provided.

As shown in FIG. 6, in this embodiment, the above-mentioned trajectory planning apparatus for the robot may include:

a phase variable constructing module 601 configured to construct a phase variable of a trajectory planning of the robot, where the phase variable is a function of two position components of the torso of the robot on a horizontal plane; and a trajectory planning module configured 602 to perform, using the phase variable, the trajectory planning on a swinging leg of the plurality of legs of the robot in each preset coordinate axis direction.

Furthermore, the phase variable constructing module 601 may include:

a functional relationship establishing unit configured to establish, using a binary quadratic equation with to-be-determined coefficients, a functional relationship between the phase variable and two position components of the torso of the robot on the horizontal plane;

a solving equation system establishing unit configured to establish a solving equation system for each of the to-be-determined coefficients of the binary quadratic equation according to a first preset value of the phase variable at an initial moment and a second preset value of the phase variable at a termination moment;

a coefficient simplifying unit configured to obtain the simplified functional relationship by simplifying an amount of the to-be-determined coefficients of the binary quadratic equation according to the solving equation system;

an optimization objective function constructing unit configured to construct an optimization objective function corresponding to the simplified functional relationship; and a coefficient calculating unit configured to construct the phase variable by calculating, according to the optimization objective function and a preset optimization algorithm, each of the to-be-determined coefficients of the binary quadratic equation.

Furthermore, the functional relationship establishing unit may be configured to establish the functional relationship as an equation of:

$$\Phi=a_1 x_w + a_2 y_w + a_3 x_w y_w + a_4 x_w^2 + a_5 y_w^2 + a_6;$$

where, $x_w$ and $y_w$ are the two position components of the torso of the robot on the horizontal plane, $a_1, a_2, a_3, a_4, a_5$ and $a_6$ are the to-be-determined coefficients, and $\Phi$ is the phase variable.

Furthermore, the solving equation system establishing unit may include:

a first solving equation establishment subunit configured to establish a first solving equation of the binary quadratic equation according to the first preset value of the phase variable at the initial moment;

a second solving equation establishing subunit configured to establish a second solving equation of the binary quadratic equation according to the second preset value of the phase variable at the termination moment;

a derivative solving equation establishing subunit configured to obtain each derivative solving equation of the second solving equation by substituting a preset position error relationship into the second solving equation, where the position error relationship is a relationship between two position error components of the torso of the robot on the horizontal plane; and a solving equation system establishing subunit configured to construct the first solving equation and each derivative solving equation of the second solving equation as the solving equation system.

Furthermore, the position error relation may be:

$$\delta x_w = C \delta y_w;$$

where, $\delta x_w$ and $\delta y_w$ are the two position error components of the torso of the robot on the horizontal plane, and C is a slope parameter of a preset switching plane.

The optimization objective function constructing unit may be configured to construct the optimization objective function as an equation of:

$$J = \Sigma(\Phi(t_i) - t_i/T)^2;$$

where, T is a period of a linear inverted pendulum model of the robot, $t_i$ is the i-th moment in the period, $\Phi(t_i)$ is the value of the phase variable corresponding to $t_i$ and J is the optimization objective function.

Furthermore, the trajectory planning module 602 may include:

a function expressing unit configured to expressing a trajectory of the swinging leg of the robot in each preset coordinate axis direction as a function of the phase variable;

a boundary condition determining unit configured to determine a boundary condition of the trajectory of the swinging leg of the robot in each preset coordinate axis direction; and a curve fitting unit configured to obtain a planned trajectory of the swinging leg of the robot in each preset coordinate axis direction by performing curve fitting on the trajectory of the swinging leg of the robot in each preset coordinate axis direction according to the boundary condition.

Those skilled in the art may clearly understand that, for the convenience and simplicity of description, for the specific operation process of the above-mentioned apparatus, modules and units, reference may be made to the corresponding process in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 7:
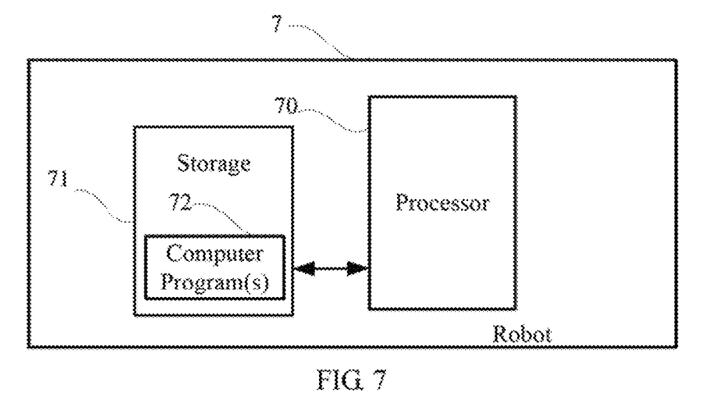
FIG. 7 is a schematic block diagram of the structure of a robot according to an embodiment of the present disclosure.

FIG. 7 is a schematic block diagram of a robot according to an embodiment of the present disclosure. For convenience of description, only parts related to this embodiment are shown.

As shown in FIG. 7, in this embodiment, the robot 7 includes a processor 70, a storage 71, and a computer program 72 stored in the storage 71 and executable on the processor 70. When executing (instructions in) the computer program 72, the processor 70 implements the steps in the above-mentioned embodiments of the xxx method, for example, steps S401-S402 shown in FIG. 4. Alternatively, when the processor 70 executes the (instructions in) computer program 72, the functions of each module/unit in the above-mentioned device embodiments, for example, the functions of the modules 601-602 shown in FIG. 6 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the pairs which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented trajectory planning method for a robot having a torso and a plurality of legs, comprising:
constructing a phase variable of a trajectory planning of the robot, wherein the phase variable is a function of two position components of the torso of the robot on a horizontal plane; and
performing, using the phase variable, the trajectory planning on a swinging leg of the plurality of legs of the robot in each preset coordinate axis direction.

2. The method of claim 1, wherein constructing the phase variable of the trajectory planning of the robot comprises:
establishing, using a binary quadratic equation with to-be-determined coefficients, a functional relationship between the phase variable and two position components of the torso of the robot on the horizontal plane;
establishing a solving equation system for each of the to-be-determined coefficients of the binary quadratic equation according to a first preset value of the phase variable at an initial moment and a second preset value of the phase variable at a termination moment;
obtaining the simplified functional relationship by simplifying an amount of the to-be-determined coefficients of the binary quadratic equation according to the solving equation system;
constructing an optimization objective function corresponding to the simplified functional relationship; and
constructing the phase variable by calculating, according to the optimization objective function and a preset optimization algorithm, each of the to-be-determined coefficients of the binary quadratic equation.

3. The method of claim 2, wherein establishing, using the binary quadratic equation with to-be-determined coefficients, the functional relationship between the phase variable and the two position components of the torso of the robot on the horizontal plane comprises:
establishing the functional relationship as an equation of:

$$\Phi = a_1 x_w + a_2 y_w + a_3 x_w y_w + a_4 x_w^2 + a_5 y_w^2 + a_6;$$

where, $x_w$ and $y_w$ are the two position components of the torso of the robot on the horizontal plane, $a_1$, $a_2$, $a_3$, $a_4$, $a_5$ and $a_6$ are the to-be-determined coefficients, and $\Phi$ is the phase variable.

4. The method of claim 2, wherein establishing the solving equation system for each of the to-be-determined coefficients of the binary quadratic equation according to the first preset value of the phase variable at the initial moment and the second preset value of the phase variable at the termination moment comprises:
establishing a first solving equation of the binary quadratic equation according to the first preset value of the phase variable at the initial moment;

establishing a second solving equation of the binary quadratic equation according to the second preset value of the phase variable at the termination moment;

obtaining each derivative solving equation of the second solving equation by substituting a preset position error relationship into the second solving equation, wherein the position error relationship is a relationship between two position error components of the torso of the robot on the horizontal plane; and constructing the first solving equation and each derivative solving equation of the second solving equation as the solving equation system.

5. The method of claim 4, wherein the position error relation is:

$$\delta x_w = C \delta y_w;$$

where, $\delta x_w$ and $\delta y_w$ are the two position error components of the torso of the robot on the horizontal plane, and C is a slope parameter of a preset switching plane.

6. The method of claim 2, wherein constructing the optimization objective function corresponding to the simplified functional relationship comprises:

constructing the optimization objective function as an equation of:

$$J = \Sigma(\Phi(t_i) - t_i/T)^2;$$

where, T is a period of a linear inverted pendulum model of the robot, $t_i$ is the i-th moment in the period, $\Phi(t_i)$ is the value of the phase variable corresponding to $t_i$, and J is the optimization objective function.

7. The method of claim 1, wherein performing, using the phase variable, the trajectory planning on the swinging leg of the plurality of legs of the robot in each preset coordinate axis direction comprises:

expressing a trajectory of the swinging leg of the robot in each preset coordinate axis direction as a function of the phase variable;

determining a boundary condition of the trajectory of the swinging leg of robot in each preset coordinate axis direction; and obtaining a planned trajectory of the swinging leg of the robot in each preset coordinate axis direction by performing curve fitting on the trajectory of the swinging leg of the robot in each preset coordinate axis direction according to the boundary condition.

8. A non-transitory computer-readable storage medium for storing one or more computer programs, wherein the one or more computer programs comprise:

instructions for constructing a phase variable of a trajectory planning of a robot having a torso and a plurality of legs, wherein the phase variable is a function of two position components of the torso of the robot on a horizontal plane; and instructions for performing, using the phase variable, the trajectory planning on a swinging leg of the plurality of legs of the robot in each preset coordinate axis direction.

9. The storage medium of claim 8, wherein the instructions for constructing the phase variable of the trajectory planning of the robot comprise:

instructions fur establishing, using a binary quadratic equation with to-be-determined coefficients, a functional relationship between the phase variable and two position components of the torso of the robot on the horizontal plane;

instructions for establishing a solving equation system for each of the to-be-determined coefficients of the binary quadratic equation according to a first preset value of the phase variable at an initial moment and a second preset value of the phase variable at a termination moment;

instructions for obtaining the simplified functional relationship by simplifying an amount of the to-be-determined coefficients of the binary quadratic equation according to the solving equation system;

instructions for constructing an optimization objective function corresponding to the simplified functional relationship; and instructions for constructing the phase variable by calculating, according to the optimization objective function and a preset optimization algorithm, each of the to-be-determined coefficients of the binary quadratic equation.

10. The storage medium of claim 9, wherein the instructions for establishing, using the binary quadratic equation with to-be-determined coefficients, the functional relationship between the phase variable and the two position components of the torso of the robot on the horizontal plane comprise:

instructions for establishing the functional relationship as an equation of:

$$\Phi = a_1 x_w + a_2 y_w + a_3 x_w y_w + a_4 x_w^2 + a_5 y_w^2 + a_6;$$

where, $x_w$ and $y_w$ are the two position components of the torso of the robot on the horizontal plane, $a_1$, $a_2$, $a_3$, $a_4$, $a_5$ and $a_6$ are the to-be-determined coefficients, and $\Phi$ is the phase variable.

11. The storage medium of claim 9, wherein the instructions for establishing the solving equation system for each of the to-be-determined coefficients of the binary quadratic equation according to the first preset value of the phase variable at the initial moment and the second preset value of the phase variable at the termination moment comprise;

instructions for establishing a first solving equation of the binary quadratic equation according to the first preset value of the phase variable at the initial moment;

instructions for establishing a second solving equation of the binary quadratic equation according to the second preset value of the phase variable at the termination moment;

instructions for obtaining each derivative solving equation of the second solving equation by substituting a preset position error relationship into the second solving equation, wherein the position error relationship is a relationship between two position error components of the torso of the robot on the horizontal plane; and instructions for constructing the first solving equation and each derivative solving equation of the second solving equation as the solving equation system.

12. The storage medium of claim 11, wherein the position error relation is:

$$\delta x_W = C \delta y_W;$$

where, $\delta x_w$ and $\delta y_w$ are the two position error components of the torso the robot on the horizontal plane, and C is a slope parameter of a preset switching plane.

13. The storage medium of claim 9, wherein the instructions for constructing the optimization objective function corresponding to the simplified functional relationship comprise:

instructions for constructing the optimization objective function as an equation of:

$$J = \Sigma(\Phi(t_i) - t_i/T)^2;$$

where, T is a period of a linear inverted pendulum model of the robot, $t_i$ is the i-th moment in the period, $\Phi(t_i)$ is the value of the phase variable corresponding to $t_i$ and J is the optimization objective function.

14. A robot, comprising:
a torso;
a plurality of legs;
a processor;
a memory coupled to the processor; and
one or more computer programs stored in the memory and executable on the processor;
wherein, the one or more computer programs comprise:
instructions for constructing a phase variable of a trajectory planning of the robot, wherein the phase variable is a function of two position components of the torso of the robot on a horizontal plane; and
instructions for performing, using the phase variable, the trajectory planning on a swinging leg of the plurality of legs of the robot in each preset coordinate axis direction.

15. The robot of claim 14, wherein the instructions for constructing the phase variable of the trajectory planning of the robot comprise:
instructions for establishing, using a binary quadratic equation with to-be-determined coefficients, a functional relationship between the phase variable and two position components of the torso of the robot on the horizontal plane;
instructions for establishing a solving equation system for each of the to-be-determined coefficients of the binary quadratic equation according to a first preset value of the phase variable at an initial moment and a second preset value of the phase variable at a termination moment;
instructions for obtaining the simplified functional relationship by simplifying an amount of the to-be-determined coefficients of the binary quadratic equation according to the solving equation system;
instructions for constructing an optimization objective function corresponding to the simplified functional relationship; and
instruction for constructing the phase variable by calculating, according to the optimization objective function and a preset optimization algorithm, each of the to-be-determined coefficients of the binary quadratic equation.

16. The robot of claim 15, wherein the instructions for establishing, using the binary quadratic equation with to-be-determined coefficients, the functional relationship between the phase variable and the two position components of the torso of the robot on the horizontal plane comprise:
instructions for establishing the functional relationship as an equation of:

$$\Phi = a_1 x_w + a_2 y_w + a_3 x_w y_w + a_4 x_w^2 + a_5 y_w^2 + a_6;$$

where, $x_w$ and $y_w$ are the two position components of the torso of the robot on the horizontal plane, $a_1, a_2, a_3, a_4, a_5$ and $a_6$ are the to-be-determined coefficients, and $\Phi$ is the phase variable.

17. The robot of claim 15, wherein the instructions for establishing the solving equation system for each of the to-be-determined coefficients of the binary quadratic equation according to the first preset value of the phase variable at the initial moment and the second preset value of the phase variable at the termination moment comprise:
instructions for establishing a first solving equation of the binary quadratic equation according to the first preset value of the phase variable at the initial moment;
instructions for establishing a second solving equation of the binary quadratic equation according to the second preset value of the phase variable at the termination moment;
instructions for obtaining each derivative solving equation of the second solving equation by substituting a preset position error relationship into the second solving equation, wherein the position error relationship is a relationship between two position error components of the torso of the robot on the horizontal plane; and
instructions for constructing the first solving equation and each derivative solving equation of the second solving equation as the solving equation system.

18. The robot of claim 17, wherein the position error relation is:

$$\delta x_w = C \delta y_w;$$

where, $\delta x_w$ and $\delta y_w$ are the two position error components of the torso of the robot on the horizontal plane, and C is a slope parameter of a preset switching plane.

19. The robot of claim 15, wherein the instructions for constructing the optimization objective function corresponding to the simplified functional relationship comprise:
instructions for constructing the optimization objective function as an equation of:

$$J = \Sigma(\Phi(t_i) - t_i/T)^2;$$

where, T is a period of a linear inverted pendulum model of the robot, $t_i$ is the i-th moment in the period, $\Phi(t_i)$ is the value of the phase variable corresponding to $t_i$, and J is the optimization objective function.

20. The robot of claim 14, wherein the instructions for performing, using the phase variable, the trajectory planning on the swinging leg of the plurality of legs of the robot in each preset coordinate axis direction comprise:
instructions for expressing a trajectory of the swinging leg of the robot in each preset coordinate axis direction as a function of the phase variable;
instructions for determining a boundary condition of the trajectory of the swinging leg of the robot in each preset coordinate axis direction; and
instructions for obtaining a planned trajectory of the swinging leg of the robot in each preset coordinate axis direction by performing curve fitting on the trajectory of the swinging leg of the robot in each preset coordinate axis direction according to the boundary condition.

* * * * *